US010897856B2

(12) United States Patent
Millar et al.

(10) Patent No.: US 10,897,856 B2
(45) Date of Patent: Jan. 26, 2021

(54) SYSTEMS AND METHODS FOR OPERATING A GROW POD

(71) Applicant: Grow Solutions Tech LLC, Lehi, UT (US)

(72) Inventors: Gary Bret Millar, Highland, UT (US); Mark Gerald Stott, Eagle Mountain, UT (US); Todd Garrett Tueller, American Fork, UT (US); John David Tueller, American Fork, UT (US)

(73) Assignee: Grow Solutions Tech LLC, Vineyard, UT (US)

( * ) Notice: Subject to any disclaimer, the term of this patent is extended or adjusted under 35 U.S.C. 154(b) by 309 days.

(21) Appl. No.: 15/987,646

(22) Filed: May 23, 2018

(65) Prior Publication Data

US 2018/0359945 A1    Dec. 20, 2018

Related U.S. Application Data

(60) Provisional application No. 62/519,321, filed on Jun. 14, 2017.

(51) Int. Cl.
*A01G 31/04* (2006.01)
*A01G 9/08* (2006.01)
(Continued)

(52) U.S. Cl.
CPC ............... *A01G 9/20* (2013.01); *A01C 23/00* (2013.01); *A01G 9/24* (2013.01); *A01G 9/246* (2013.01);
(Continued)

(58) Field of Classification Search
CPC .... A01G 31/042; A01G 31/045; A01G 9/088; A01G 9/081; A01G 9/143; A01G 31/04;
(Continued)

(56) References Cited

U.S. PATENT DOCUMENTS

| 10,390,504 B2 * | 8/2019 | Dufresne ............... B65G 1/026 |
| 2014/0115958 A1 | 5/2014 | Helene et al. |

(Continued)

FOREIGN PATENT DOCUMENTS

| CN | 201440839 U | 4/2010 |
| CN | 203279590 U | 11/2013 |

(Continued)

OTHER PUBLICATIONS

International Search Report & Written Opinion dated Oct. 19, 2018 for International Application No. PCT/US2018/034324 filed on May 24, 2018.

(Continued)

*Primary Examiner* — Kristen C Hayes
(74) *Attorney, Agent, or Firm* — Dinsmore & Shohl LLP

(57) ABSTRACT

Systems and methods for operating a grow pod are provided herein. One embodiment of a system includes a cart that moves on a track of the grow pod, where the cart receives a seed for growing into a plant. The system may also include a human-machine interface (HMI) that is coupled to the grow pod and a pod computing device coupled to the HMI. The pod computing device stores logic that, when executed by the pod computing device, causes the system to receive a grow recipe for the seed in the cart, wherein the grow recipe includes actuation of at least one environmental affecter and provide a user option to alter functionality of the grow recipe. In some embodiments, the logic may also cause the system to receive a user selection of the user option and in response to receiving the user selection, alter functionality of the grow recipe.

15 Claims, 14 Drawing Sheets

(51) Int. Cl.
*A01G 9/20* (2006.01)
*A01C 23/00* (2006.01)
*A01G 9/24* (2006.01)
*A01G 27/00* (2006.01)
*G06Q 10/06* (2012.01)
*G06Q 50/02* (2012.01)

(52) U.S. Cl.
CPC ........... *A01G 9/247* (2013.01); *A01G 27/001* (2013.01); *A01G 31/042* (2013.01); *G06Q 10/06395* (2013.01); *G06Q 50/02* (2013.01); *A01G 9/249* (2019.05)

(58) Field of Classification Search
CPC . A01G 31/06; A01G 9/00; A01G 9/14; A01G 9/24
See application file for complete search history.

(56) References Cited

U.S. PATENT DOCUMENTS

| | | | |
|---|---|---|---|
| 2014/0167960 A1 | 6/2014 | Argue et al. | |
| 2015/0088366 A1 | 3/2015 | Argue et al. | |
| 2016/0179779 A1 | 6/2016 | Shimazu | |
| 2017/0139380 A1 | 5/2017 | England et al. | |
| 2017/0142912 A1* | 5/2017 | Gasmer | A01G 9/025 |
| 2018/0007850 A1* | 1/2018 | Dufresne | B65G 1/026 |
| 2019/0029200 A1* | 1/2019 | Mawendra | A01G 20/30 |
| 2019/0133064 A1* | 5/2019 | Fyvolent | A01G 7/045 |
| 2019/0208711 A1* | 7/2019 | Sahu | A01G 31/06 |
| 2019/0281771 A1* | 9/2019 | Setton | A01G 9/249 |
| 2019/0382211 A1* | 12/2019 | Buberman | B25J 11/00 |
| 2020/0012852 A1* | 1/2020 | Ding | G06K 9/6274 |
| 2020/0100445 A1* | 4/2020 | Saba | G06F 7/00 |

FOREIGN PATENT DOCUMENTS

| | | | | |
|---|---|---|---|---|
| CN | 204560493 U | 8/2015 | | |
| CN | 103314834 B | 10/2015 | | |
| CN | 205920380 U | 2/2017 | | |
| CN | 206808240 U | 12/2017 | | |
| KR | 20170097817 A | 8/2017 | | |
| NL | 9201632 A | * | 4/1994 | A01G 9/143 |
| WO | 2016164652 A1 | 10/2016 | | |
| WO | WO-2018119407 A1 | * | 6/2018 | B25J 9/1679 |
| WO | WO-2019221810 A1 | * | 11/2019 | G08F 3/0619 |

OTHER PUBLICATIONS

"An automated irrigation system for greenhouses"; URL: http://pubs.sciepub.com/ajeee/5/2/3/; American Journal of Electrical and Electronic Engineering; Apr. 7, 2017.

"Advances, processes today,methods of control and automation of greenhouses for crops"; URL: https://www.ripublication.com/ijaer17/ijaerv12n1_07.pdf; International Journal of Applied Engineering Research; 2017.

The Modern Farming Company; URL: http://boweryfarming.com/; Bowrey, Inc.

* cited by examiner

SYSTEMS AND METHODS FOR OPERATING A GROW POD

CROSS REFERENCE

This application claims the benefit of U.S. Provisional Application Ser. No. 62/519,321, filed on Jun. 14, 2017, which is incorporated by reference in its entirety.

TECHNICAL FIELD

Embodiments described herein generally relate to systems and methods for operating a grow pod and, more specifically, to embodiments that provide one or more user interfaces for an assembly line grow pod.

BACKGROUND

As background, while crop growth technologies have advanced over the years, there are still many problems in the farming and crop industry today. As an example, while technological advances have increased efficiency and production of various crops, many factors may affect a harvest, such as weather, disease, infestation, and the like. Additionally, while the United States currently has suitable farmland to adequately provide food for the U.S. population, other countries and future populations may not have enough farmland to provide the appropriate amount of food.

As an example, many current greenhouses allow a user to grow plants in a somewhat controlled environment. However, these current solutions do not provide the ability to import customized controls and/or operation of the greenhouse or provide user interface for viewing and/or altering the controls or operation.

SUMMARY

Systems and methods for operating a grow pod are provided herein. One embodiment of a system includes a cart that moves on a track of the grow pod, where the cart receives a seed for growing into a plant. The system may also include a human-machine interface (HMI) that is coupled to the grow pod and a pod computing device coupled to the HMI. The pod computing device stores logic that, when executed by the pod computing device, causes the system to receive a grow recipe for the seed in the cart, where the grow recipe includes actuation of at least one environmental affecter and provide a user option to alter functionality of the grow recipe. In some embodiments, the logic may also cause the system to receive a user selection of the user option and in response to receiving the user selection, alter functionality of the grow recipe.

In another embodiment, a system grow pod includes a track that passes a plurality of environment affecters for growing a plant and a cart that moves on the track, where the cart receives the plant and travels the track for exposing the plant to output of the plurality of environment affecters. The grow pod further includes a human-machine interface (HMI) that is coupled to the grow pod and a pod computing device coupled to the HMI. The pod computing device may store logic that, when executed by the pod computing device, causes the grow pod to receive a grow recipe for the plant in the cart, where the grow recipe includes actuation of the plurality of environment affecters. The logic may further cause the grow pod to determine if the grow recipe is formatted for the grow pod and, in response to a determination that the grow recipe is not formatted for the grow pod, determine a difference in a generic grow pod for which the grow recipe is formatted and the grow pod, and create an alteration to the grow recipe to operate on the grow pod. In some embodiments, the logic further causes the grow pod to provide a user interface via the HMI with a user option to accept the alteration, receive, via the user interface, a user selection of the user option, and in response to receiving the user selection, alter functionality of the grow recipe.

In yet another embodiment, a pod computing device includes a memory component that stores logic that, when executed by the pod computing device, causes the pod computing device to receive a grow recipe for a plant in an assembly line grow pod, where the grow recipe includes actuation of an environmental affecter or a plurality of environment affecters and the plurality of environment affecters alter an environment of the assembly line grow pod to enhance an output of the plant. The logic may further cause the pod computing device to receive data related to growth of the plant, determine if growth of the plant meet a predicted growth of the plant, and in response to determining that the growth of the plant does not meet the predicted growth of the plant, determine a growth alteration to the grow recipe for improving growth of the plant. In some embodiments, the logic causes the pod computing device to provide a user interface with a user option to implement the growth alteration into the grow recipe, receive, via the user interface, a user selection of the user option, and in response to receiving the user selection, alter functionality of the grow recipe according to the growth alteration.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for operating an assembly line grow pod. Some embodiments include one or more user interfaces for implementing recipes, viewing statuses of the assembly line grow pod, manually actuating or changing a function of the assembly line grow pod, and/or performing other actions. The systems and methods for operating an assembly line grow pod incorporating the same will be described in more detail, below.

Figure 1:
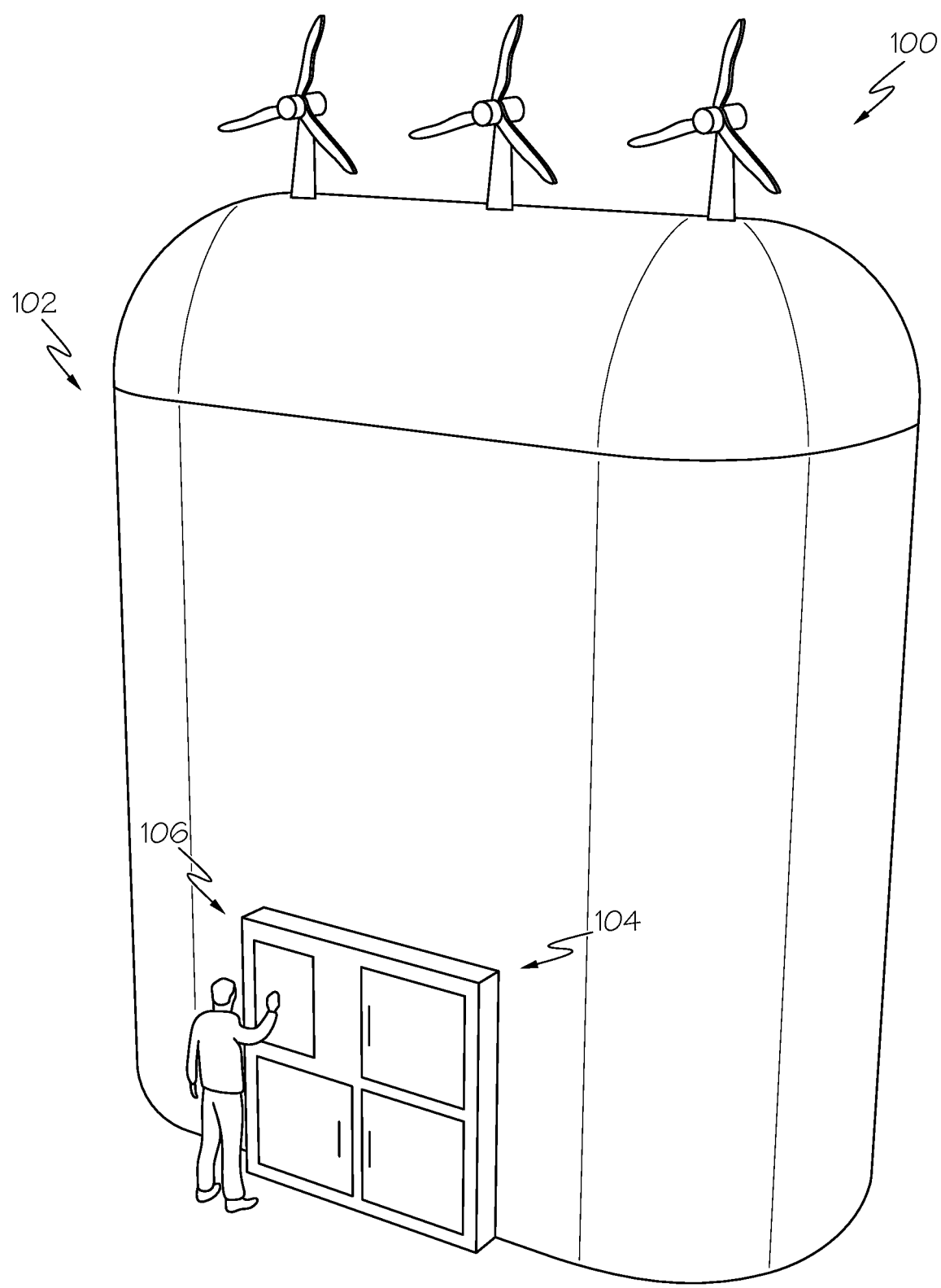
FIG. 1 depicts an assembly line grow pod according to embodiments described herein.

Referring now to the drawings, FIG. 1 depicts a grow pod 100 according to embodiments described herein. As illustrated, the grow pod 100 may be configured as an assembly line grow pod and may be a self-contained unit that maintains an environment inside and prevents the external environment for entering. As such, the grow pod 100 may include an external shell 102 to provide this function. Coupled to the external shell 102 is a control panel 104 with a user input/output device 106, such as a touch screen, monitor, keyboard, mouse, etc.

Figure 2A:
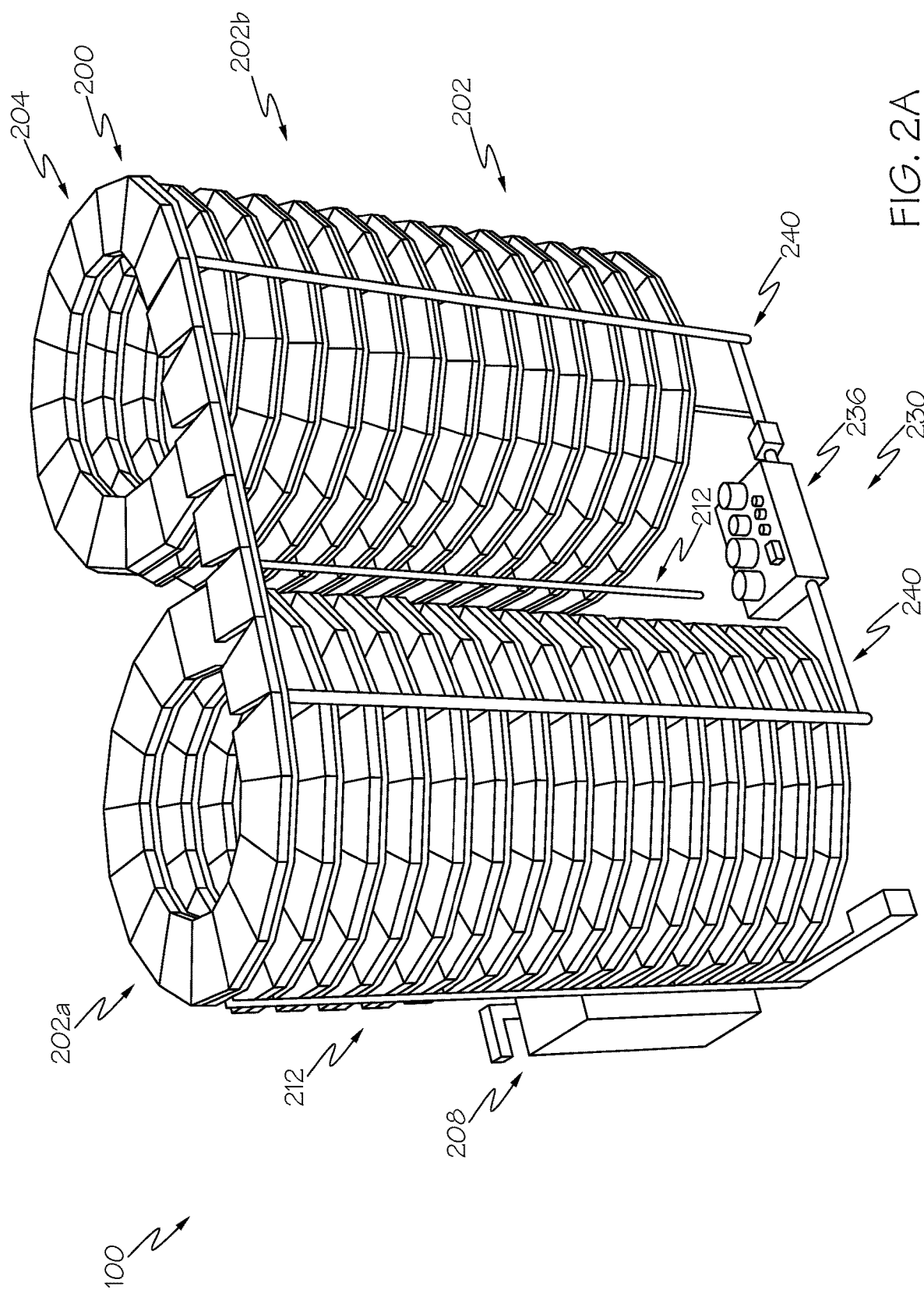
FIGS. 2A-2E depict an operational structure for an assembly line grow pod, according to embodiments described herein.

FIGS. 2A-2E depict an operational structure 200 for a grow pod 100, according to embodiments described herein. As illustrated in FIG. 2A, operational structure 200 may reside inside the grow pod 100 and may include a track 202 that holds one or more carts 204. The track 202 may include an ascending portion 202a, a descending portion 202b, and a connection portion 202c. The track 202 may wrap around (in a counterclockwise direction in FIG. 2A, although clockwise or other configurations are also contemplated) a first axis such that the carts 204 ascend upward in a vertical direction. The connection portion 202c may be relatively level (although this is not a requirement) and is utilized to transfer carts 204 to the descending portion 202b. The descending portion 202b may be wrapped around a second axis (again in a counterclockwise direction in FIG. 2A) that is substantially parallel to the first axis, such that the carts 204 may be returned closer to ground level.

While not explicitly illustrated in FIG. 2A, the grow pod 100 may also include a plurality of lighting devices, such as light emitting diodes (LEDs). The lighting devices may be disposed on the track 202 opposite the carts 204, such that the lighting devices direct light waves to the carts 204 (and/or plants) on the portion the track 202 directly below. In some embodiments, the lighting devices are configured to create a plurality of different colors and/or wavelengths of light, depending on the application, the type of plant being grown, and/or other factors. While in some embodiments, LEDs are utilized for this purpose, this is not a requirement. Any lighting device that produces low heat and provides the desired functionality may be utilized.

Also depicted in FIG. 2A is a master controller 236. The master controller 236 may include a pod computing device 230, a nutrient device, a water distribution component, and/or other hardware for controlling various components of the grow pod 100.

Coupled to the master controller 236 is a seeder component 208. The seeder component 208 may be configured to seed one or more carts 204 as the carts 204 pass the seeder in the assembly line. Depending on the particular embodiment, each cart 204 may include a single section tray for receiving a plurality of seeds. Some embodiments may include a multiple section tray for receiving individual seeds in each section (or cell). In the embodiments with a single section tray, the seeder component 208 may detect presence of the respective cart 204 and may begin laying seed across an area of the single section tray. The seed may be laid out according to a desired depth of seed, a desired number of seeds, a desired surface area of seeds, and/or according to other criteria. In some embodiments, the seeds may be pre-treated with nutrients and/or anti-buoyancy agents (such as water) as these embodiments may not utilize soil to grow the seeds and thus might need to be submerged.

In the embodiments where a multiple section tray is utilized with one or more of the carts 204, the seeder component 208 may be configured to individually insert seeds into one or more of the sections of the tray. Again, the seeds may be distributed on the tray (or into individual cells) according to a desired number of seeds, a desired area the seeds should cover, a desired depth of seeds, etc.

The watering device may be coupled to one or more water lines 240, which distribute water and/or nutrients to one or more trays at predetermined areas of the grow pod 100. In some embodiments, seeds may be sprayed to reduce buoyancy and then flooded. Additionally, water usage and consumption may be monitored, such that at subsequent watering stations, this data may be utilized to determine an amount of water to apply to a seed at that time.

Also depicted in FIG. 2A are airflow lines 212. Specifically, the master controller 236 may include and/or be coupled to at least one airflow device that delivers airflow for temperature control, pressure, carbon dioxide control, oxygen control, nitrogen control, etc. Accordingly, the airflow lines 212 may distribute the airflow at predetermined areas in the grow pod 100.

Figure 2B:
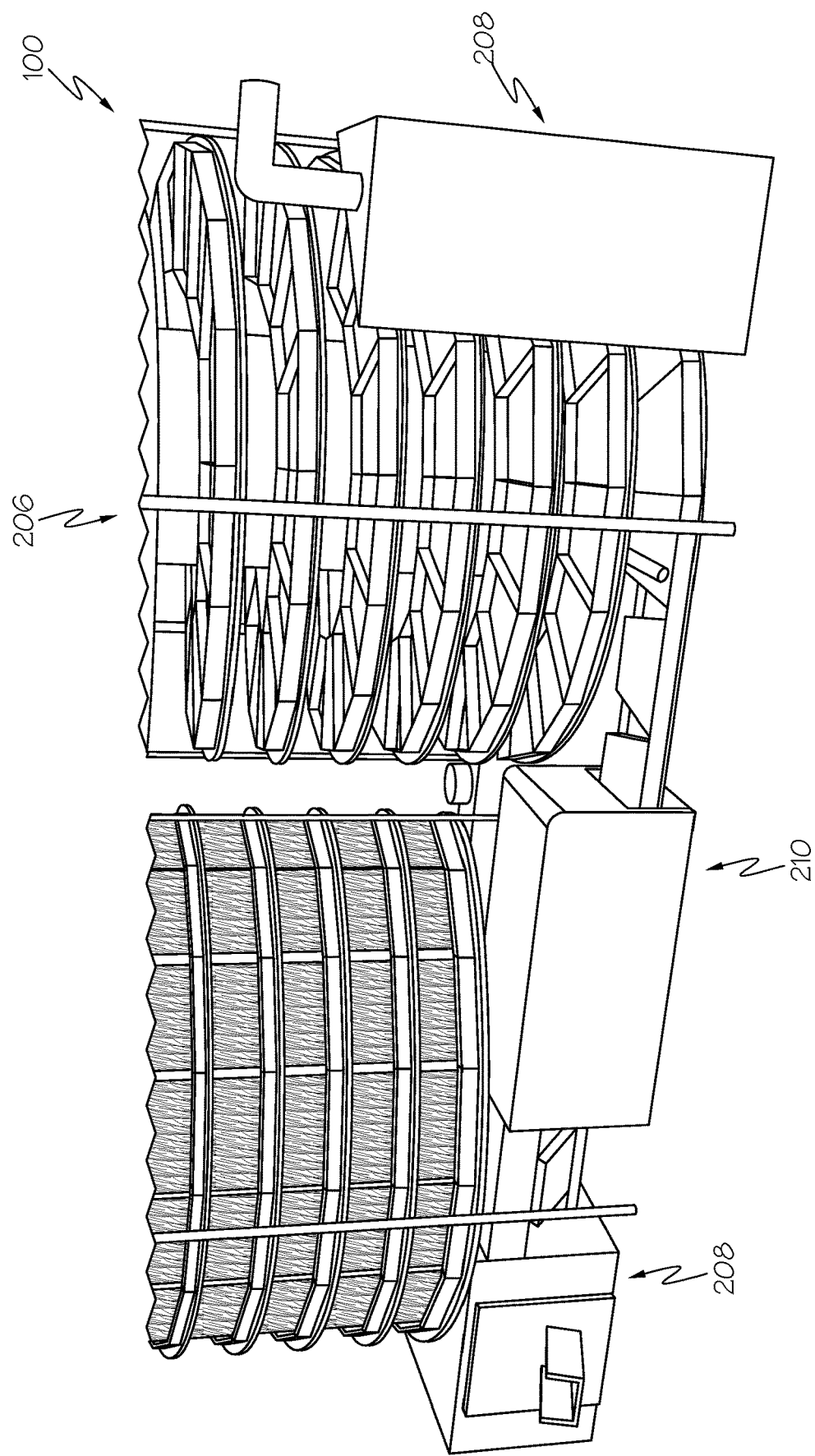

FIG. 2B depicts a plurality of components for a grow pod 100, according to embodiments described herein. As illustrated in FIG. 2, the seeder component 208 is illustrated, as well as a lighting device 206, a harvester component 238, and a sanitizer component 210. As described above, the seeder component 208 may be configured to seed the trays of the carts 204. The lighting devices 206 may provide light waves that may facilitate plant growth. Depending on the particular embodiment, the lighting devices 206 may be stationary and/or movable. As an example, some embodiments may alter the position of the lighting devices 206, based on the plant type, stage of development, recipe, and/or other factors.

Additionally, as the plants are lighted, watered, and provided nutrients, the carts 204 will traverse the track 202 of the grow pod 100. Additionally, the grow pod 100 may detect a growth and/or fruit output of a plant and may determine when harvesting is warranted. If harvesting is warranted prior to the cart 204 reaching the harvester, modifications to a recipe may be made for that particular cart 204 until the cart 204 reaches the harvester. Conversely, if a cart 204 reaches the harvester component 238 and it has been determined that the plants in that cart 204 are not ready for harvesting, the grow pod 100 may commission that cart 204 for another lap. This additional lap may include a different dosing of light, water, nutrients, etc. and the speed of the cart 204 could change, based on the development of the plants on the cart 204. If it is determined that the plants on a cart 204 are ready for harvesting, the harvester component 238 may facilitate that process.

In some embodiments, the harvester component 238 may simply cut the plants at a predetermined height for harvesting. In some embodiments, the tray may be overturned to remove the plants from the tray and into a processing container for chopping, mashing, juicing, etc. Because many embodiments of the grow pod 100 do not use soil, minimal (or no) washing of the plants may be necessary prior to processing.

Similarly, some embodiments may be configured to automatically separate fruit from the plant, such as via shaking, combing, etc. If the remaining plant material may be reused to grow additional fruit, the cart 204 may keep the remaining plant and return to the growing portion of the assembly line.

If the plant material is not to be reused to grow additional fruit, it may be discarded or processed, as appropriate.

Once the cart 204 and tray are clear of plant material, the sanitizer component 210 may be implemented to remove any particulate, plant material, etc. that may remain on the cart 204. As such, the sanitizer component 210 may implement any of a plurality of different washing mechanisms, such as high pressure water, high temperature water, and/or other solutions for cleaning the cart 204 and/or tray. In some embodiments, the tray may be overturned to output the plant for processing and the tray may remain in this position. As such, the sanitizer component 210 may receive the tray in this position, which may wash the cart 204 and/or tray and return the tray back to the growing position. Once the cart 204 and/or tray are cleaned, the tray may again pass the seeder, which will determine that the tray requires seeding and will begin the process of seeding.

Figure 2C:
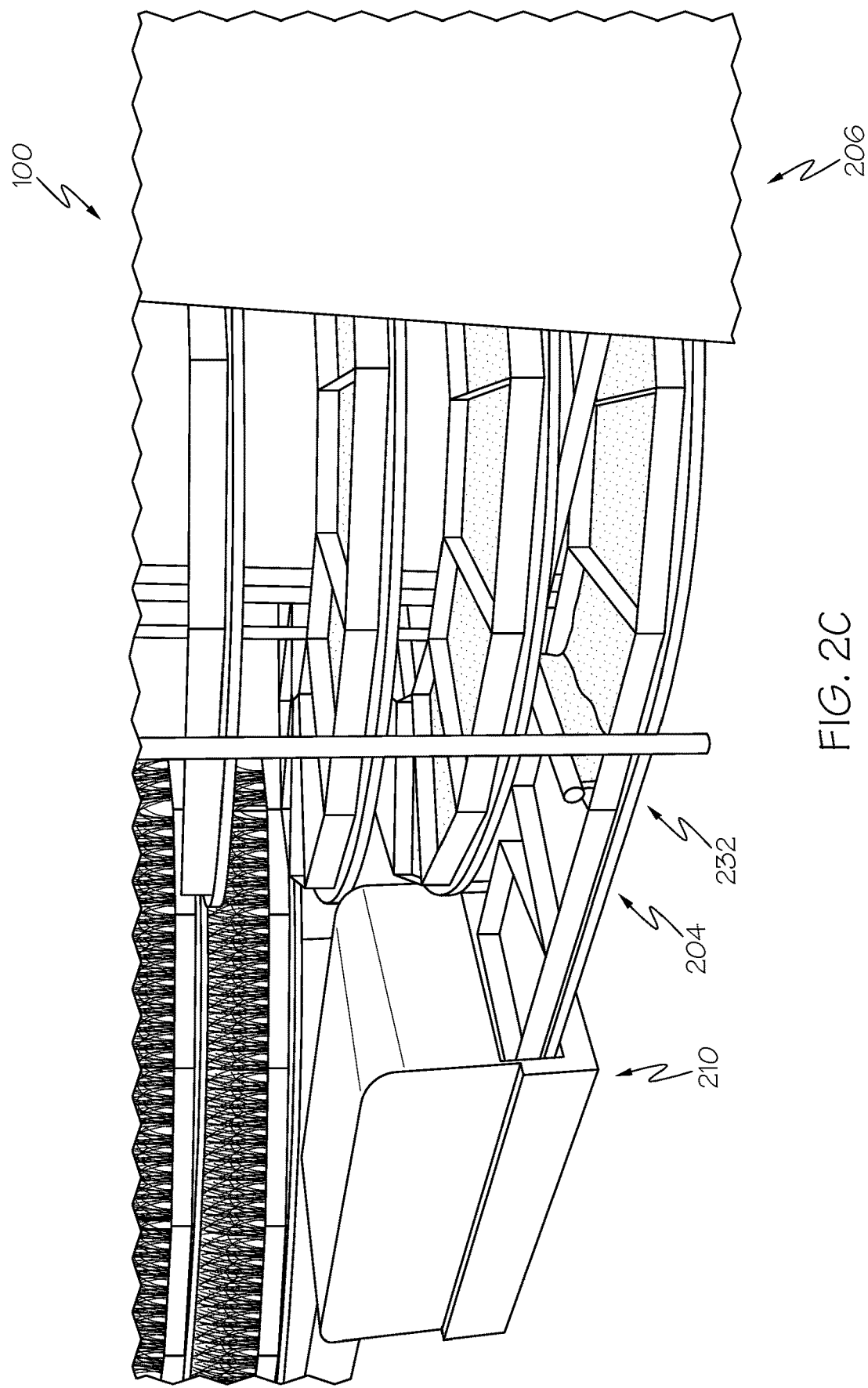

FIG. 2C depicts a seeder component 208 for as grow pod 100, according to embodiments described herein. As illustrated, the sanitizer component 210 may return the tray to the growing position, which is substantially parallel to ground. Additionally, a seeder head 242 may facilitate seeding of the tray as the cart 204 passes. It should be understood that while the seeder head 232 is depicted in FIG. 2B as an arm that spreads a layer of seed across a width of the tray, this is merely an example. Some embodiments may be configured with a seeder head 242 that is capable of placing individual seeds in a desired location. Such embodiments may be utilized in a multiple section tray with a plurality of cells, where one or more seeds may be individually placed in the cells.

Figure 2D:
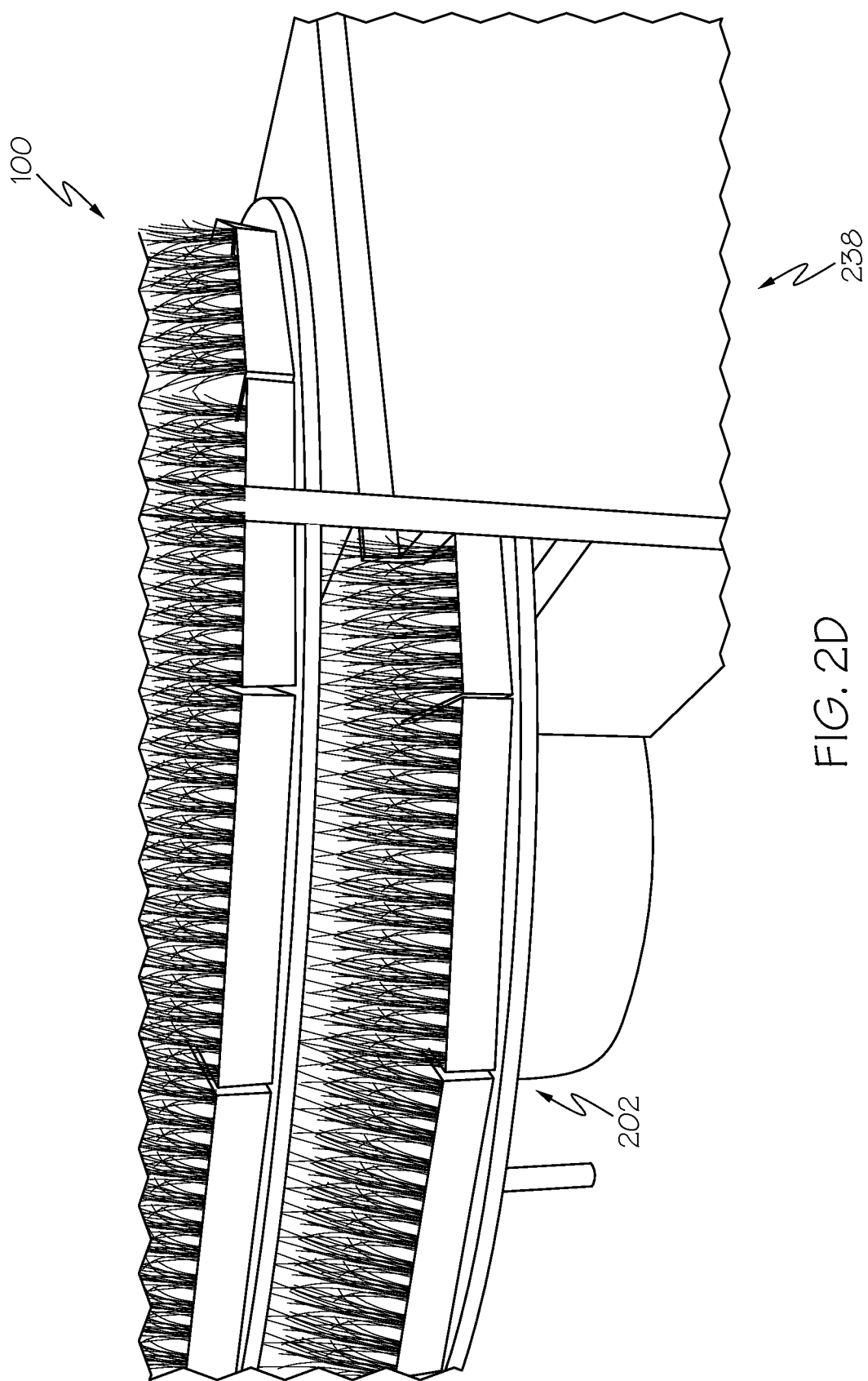

FIG. 2D depicts a harvester component 238 for a grow pod 100 according to embodiments described herein. As illustrated, the carts 204 may traverse the track 202 to facilitate growth of the plants. Depending on the particular embodiment, the carts 204 may be individually powered and/or powered collectively. As an example, some embodiments are configured such that each cart 204 includes a motor, which is powered by a connection to the track 202. In these embodiments, the track 202 is electrified to provide power and/or communications to the cart 204. If a cart 204 becomes incapacitated, communication may be sent to other carts 204 to push the incapacitated cart 204. Similarly, some embodiments may include a cart 204 that is battery powered, such that a battery charging component may be included in the grow pod 100. The battery may be used as primary power and/or backup power.

Regardless, the carts 204 may traverse the track 202 to the harvester component 238 for cutting, chopping, dumping, juicing, and/or otherwise processing. Depending on the embodiment, the final product may include a powder form of the plant, a chopped form of the plant, and/or other form of the plant.

Figure 2E:
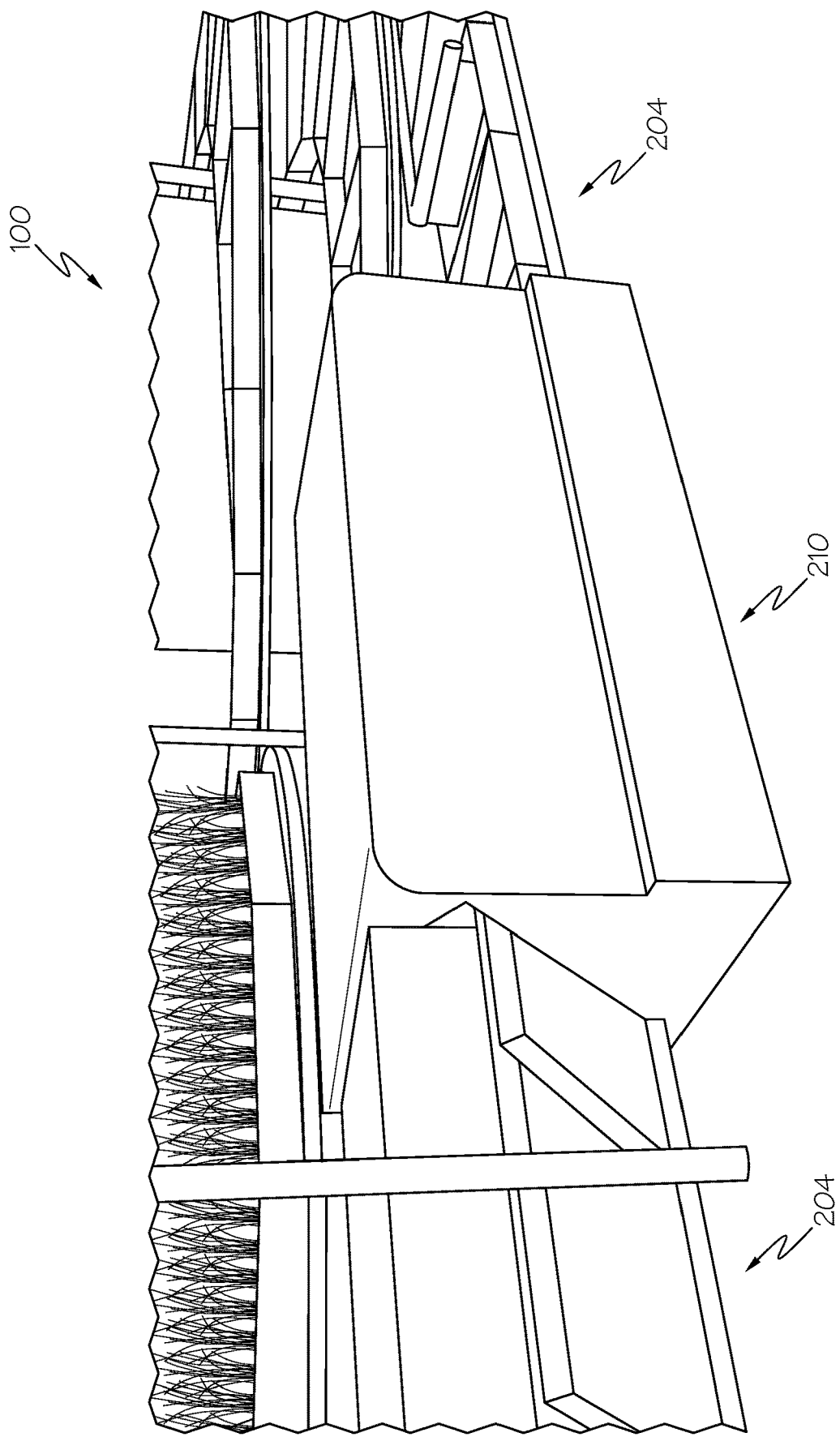

FIG. 2E depicts a sanitizer component 210 of a grow pod 100, according to embodiments described herein. As illustrated, the sanitizer component 210 may receive a cart 204 where the tray has been overturned and/or may overturn the tray itself. Regardless, the sanitizer component 210 may clean the cart 204 and/or tray and return the tray to the grow position.

It should be understood that while the tray may be overturned, this is merely an example. Specifically, in some embodiments it may desirable to keep the cart 204 in contact with the track 202 to provide power, communication, and/or otherwise propel the cart 204 through the sanitizer component 210. As such, overturning only the tray (and not the cart 204) may be desired in these embodiments. In some embodiments however, the sanitizer component 210 may operate without overturning the tray. Similarly, some embodiments may be configured such that both the tray and cart 204 are overturned to facilitating cleaning.

It should also be understood that while the tray may be overturned, this simply implies that the tray is rotated such that a top surface is angled from level. This may include rotating the tray 90 degrees, 180 degrees, or rotating the tray only a few degrees, depending on the embodiment.

Figure 3:
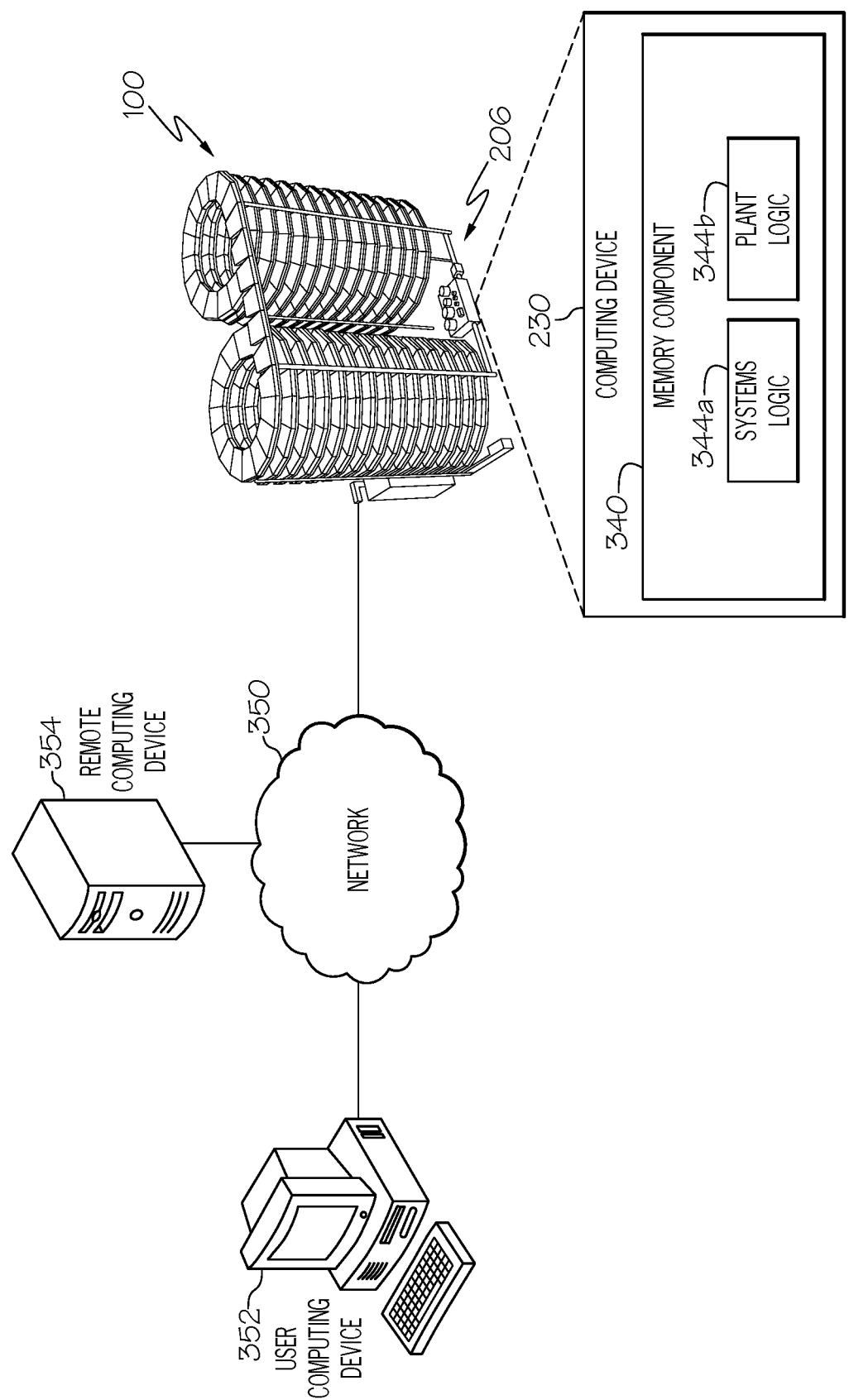
FIG. 3 depicts a computing environment for an assembly line grow pod, according to embodiments described herein.

FIG. 3 depicts a computing environment for a grow pod 100, according to embodiments described herein. As illustrated, the grow pod 100 may include a master controller 236, which may include a pod computing device 230. The pod computing device 230 may include a memory component 340, which stores systems logic 344a and plant logic 344b. As described in more detail below, the systems logic 344a may monitor and control operations of one or more of the components of the grow pod 100 and may provide one or more of the user interfaces described and/or depicted herein. The plant logic 344b may be configured to determine and/or receive a recipe for plant growth and may facilitate implementation of the recipe via the systems logic 344a.

Additionally, the grow pod 100 is coupled to a network 350. The network 350 may include the internet or other wide area network, a local network, such as a local area network, a near field network, such as Bluetooth or a near field communication (NFC) network. The network 350 is also coupled to a user computing device 352 and/or a remote computing device 354. The user computing device 352 may include a personal computer, laptop, mobile device, tablet, server, etc. and may be utilized as an interface with a user. As an example, a user may send a recipe to the pod computing device 230 for implementation by the grow pod 100. Another example may include the grow pod 100 sending notifications to a user of the user computing device 352.

Similarly, the remote computing device 354 may include a server, personal computer, tablet, mobile device, etc. and may be utilized for machine to machine communications. As an example, if the grow pod 100 determines a type of seed being used (and/or other information, such as ambient conditions), the pod computing device 230 may communicate with the remote computing device 354 to retrieve a previously stored recipe for those conditions. As such, some embodiments may utilize an application program interface (API) to facilitate this or other computer-to-computer communications.

Figure 4:
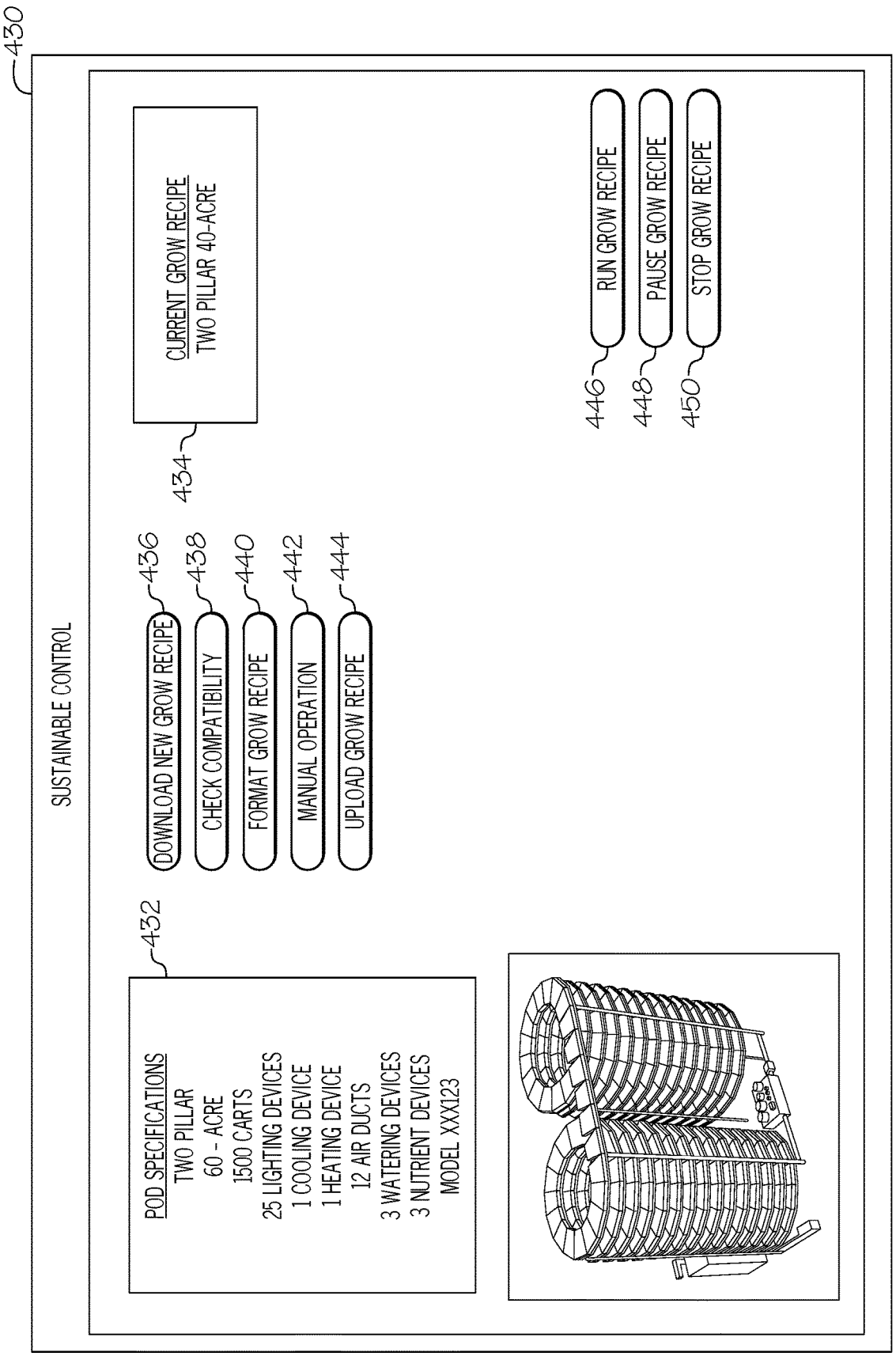
FIG. 4 depicts a user interface for an assembly line grow pod, according to embodiments described herein.

FIG. 4 depicts a user interface 430 for an assembly line grow pod, according to embodiments described herein. As illustrated, the user interface 430 includes a pod section 432 and a grow recipe section 434. Specifically, the pod computing device 230 may store and/or be configured to determine the specifications of the grow pod 100. The specifications of the grow pod 100 may include one or more environmental affecters (such as lighting devices, cooling devices, heating devices, air ducts, watering devices, nutrient devices, pressure devices, and/or other environmental affecters), a number of carts present on the grow pod 100, a number of carts that the grow pod 100 can utilize, a model number, a number of pillars, and/or other specifications and characteristics of the grow pod 100.

Similarly, the grow recipe section 434 may provide a description and/or characteristics of a received grow recipe. The grow recipe may include a recipe program that is a computer program that specifically defines operation of the grow pod 100 for growing a predetermined plant. Specifically, a grow recipe may be received via the grow pod 100 directly from a user, via download from the remote computing device 354, and/or from another source. In some embodiments, the grow recipe may include metadata that describes one or more specifications of the grow pod 100 for which the grow recipe was created. In some embodiments, the pod computing device 230 may be configured to analyze the grow recipe to determine specifications for the grow pod for which the grow recipe was written and/or for all grow pods on which the grow recipe will properly operate.

Also provided in the user interface 430 is a download option 436. The download option 436 may be selected to receive a different grow recipe for the grow pod 100. In some embodiments, the pod computing device 230 may only download grow recipes that are formatted for the grow pod 100 and/or that the pod computing device 230 can format to operate on the grow pod 100.

The user interface 430 also includes a compatibility option 438. In response to selecting the compatibility option 438, the pod computing device 230 may perform an analysis of whether a stored grow recipe is compatible with the grow pod 100. The user interface 430 also includes a format option 440. In response to selection of the format option 440, the stored grow recipe may be formatted to operate on the grow pod 100. The user interface 430 also includes a manual option 442. In response to selection of the manual option 442, various components of the grow pod 100 may be manually actuated. Also provided is an upload option 444 for uploading the stored grow recipe to the remote computing device 354.

The user interface 430 also provides a run option 446, a pause option 448, and a stop option 450 for manually running, pausing, and stopping the grow pod 100 with the stored grow recipe. Other options may also be provided.

Figure 5:
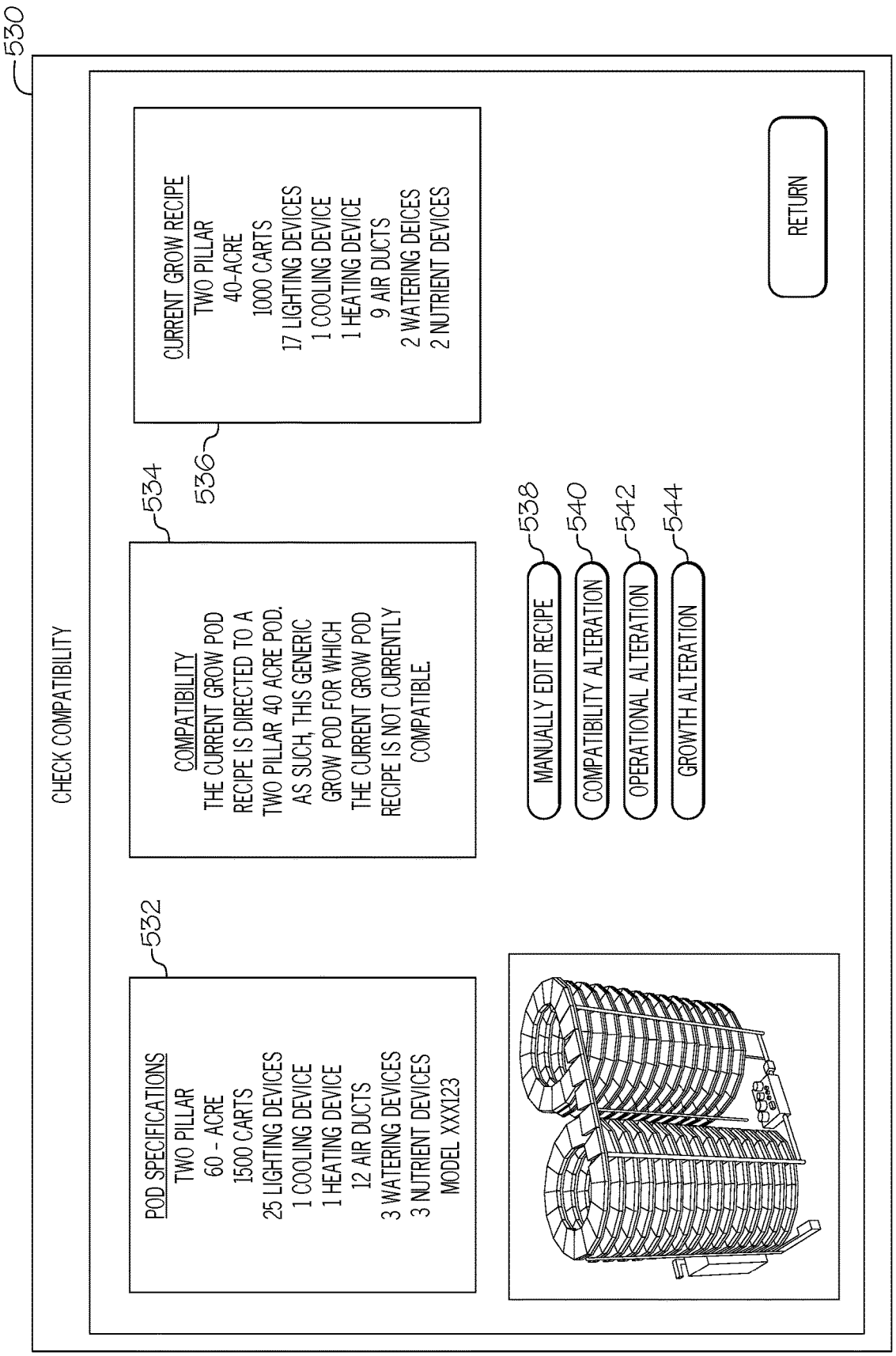
FIG. 5 depicts a user interface for checking compatibility of a grow recipe, according to embodiments described herein.

FIG. 5 depicts a user interface 530 for checking compatibility of a grow recipe, according to embodiments described herein. In response to selection of the compatibility option 438 from FIG. 4, the user interface 530 may be provided. As illustrated, the user interface 530 includes a pod section 532, a compatibility section 534, and a grow recipe section 536. Similar to the pod section 432 from FIG. 4, the pod section 532 may provide one or more features, components, and/or characteristics of the grow pod 100. The grow recipe section 536 may similarly provide one or more features, components, and/or characteristics of a grow pod on which the stored grow recipe will properly operate. While the grow recipe section 434 from FIG. 4 illustrates a subset of information provided by the grow recipe section 536, this is just an example. Depending on the particular embodiment, either may provide more or less (or the same) information.

The compatibility section 534 may provide information and/or specifications related to the compatibility of the stored grow recipe with the grow pod 100. Specifically, embodiments described herein may be configured to determine the components of the grow pod 100, the components for a grow pod on which the grow recipe will properly operate, and perform an analysis of whether the grow recipe is compatible with the grow pod 100. If the grow recipe is compatible with the grow pod 100, the compatibility section 534 may indicate such. If the two are not compatible, the pod computing device 230 may determine where the incompatibility resides and/or one or more instructions to make the grow pod 100 compatible with the grow recipe (or vice versa).

As an example, while embodiments herein are directed to altering the grow recipe to fit the grow pod 100, some embodiments may instead be configured to alter the grow pod 100. As an example, if the incompatibility is determined to be that the grow pod 100 includes an extra light that the grow recipe does not have and the grow recipe cannot run currently, the pod computing device 230 may provide an option to disable an extra light from the grow pod 100. Other alterations to the grow pod 100 may also be made.

Also provided in the user interface 530 are an edit option 538, a compatibility alteration option 540, an operational alteration option 542, and a growth alteration option 544. In response to selection of the edit option 538, one or more additional options may be provided for manually editing the grow recipe (see FIG. 6). In response to selection of the compatibility alteration option 540, one or more alterations to the grow recipe and/or grow pod 100 may be provided, which are related to compatibility of the grow recipe with the grow pod 100. In response to selection of the operational alteration option 542, additional alterations and/or suggestions for altering the grow recipe and/or the grow pod 100, which are related to improving operational efficiency of the grow pod 100 with the grow recipe may be provided.

Specifically, while the grow pod 100 may operate with the grow recipe, the operation may have an operational inefficiency which may be taxing on the hardware of the grow pod 100. As such, embodiments described herein may be configured to determine where those operational inefficiencies exist in the grow pod 100 and/or grow recipe and provide suggestions or adjustments to address those issues. In response to selection of the growth alteration option 544, a suggestion and/or alteration may be provided for determining and/or implementing an improvement in growth of one or more plants that reside on the grow pod 100.

Because the grow recipe may have been designed for a different grow pod than the grow pod 100, the grow recipe may be functional, but not optimized for the grow pod 100. As an example, it may be determined that there is significant delay between operations because the grow recipe was designed for a larger grow pod, and/or the pod computing device 230 is not as fast or capable as the computing device for which the grow recipe was designed. As such, in response to selection of the operational alteration option 542, embodiments may determine alterations to the grow recipe and/or identify sections of the grow recipe code that appears to cause the inefficiency. An example might include a sensor (such as a camera, motion sensor, laser sensor, etc.) determining that a delay occurs at a specific portion of the grow pod 100 and the pod computing device 230 recognizing which portion of the grow recipe relates to that action. The pod computing device 230 may then provide a recommendation for the user to review that portion of code and/or provide other recommendations, such as if a similar issue has occurred in the past to this grow pod 100 or other grow pods.

Similarly, if the pod computing device 230 determines that one or more plants are not developing or plant output is below a predetermined threshold, the pod computing device 230 may utilize sensor data (such as from an infrared sensor, a camera, a proximity device, etc.) to determine at which point (or points) the plant output slowed. From this information, a determination may be made regarding a corrective action with regard to the grow recipe that may be taken. If the pod computing device 230 determines that the grow recipe is not the issue, this may also be indicated.

Figure 6:
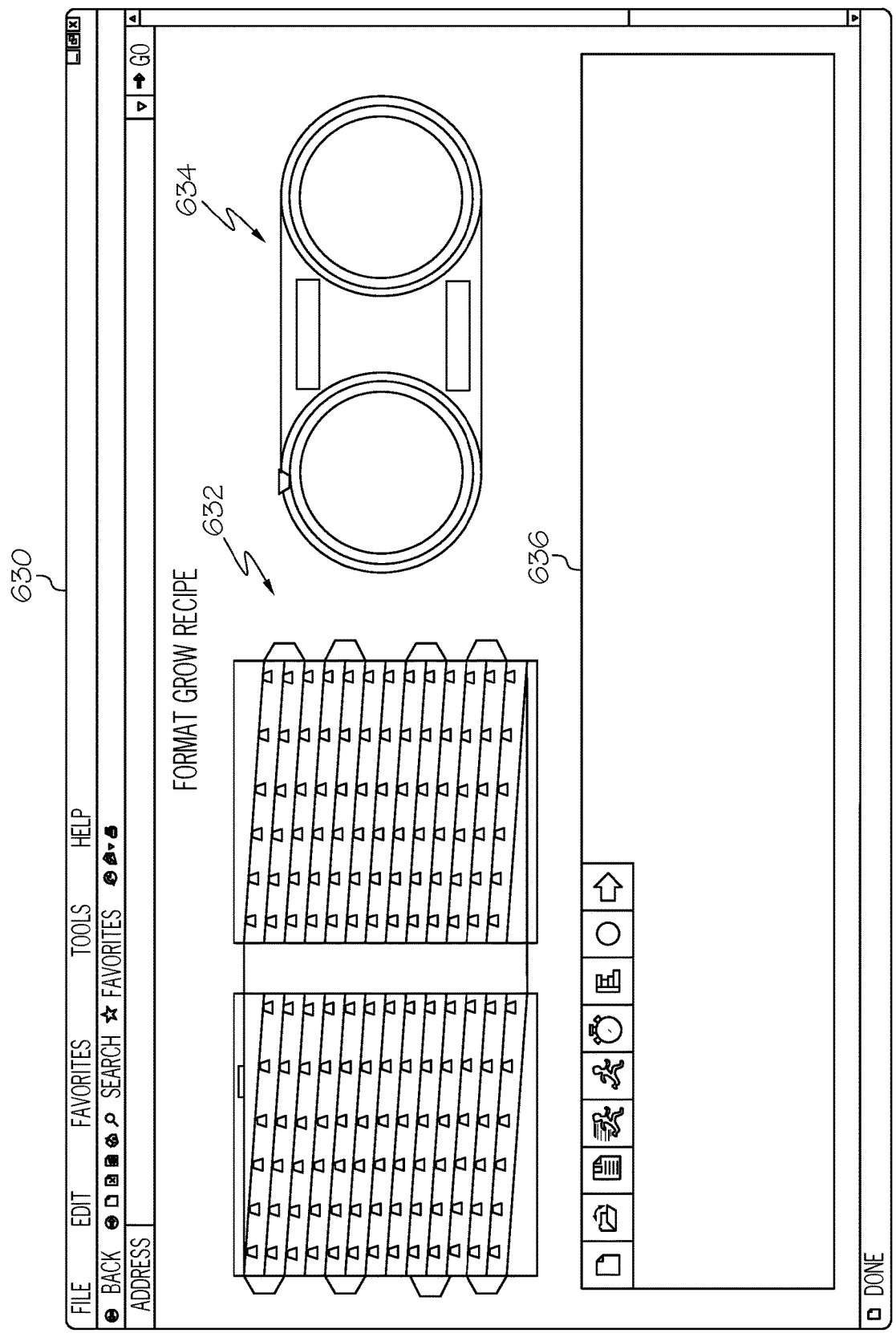
FIG. 6 depicts a user interface for formatting a grow recipe, according to embodiments described herein.

FIG. 6 depicts a user interface 630 for formatting a grow recipe, according to embodiments described herein. In response to selection of the format option 440 from FIG. 4, the user interface 630 may be provided. As illustrated, the user interface 630 may include a side view section 632, a top view section 634, and a text editing section 636. The side view section 632 may provide a visual depiction of a side view of the grow pod 100. Similarly, the top view section 634 may provide a top view of the grow pod 100. As the grow recipe is run, the side view section 632 and top view section 634 may animate to depict motion of the grow pod 100. Additionally, the user may select a part of the graphical representation, which will cause the text editing section 636 to display the corresponding portion of the grow recipe that is responsible for the action and/or area of the grow pod 100. Additionally, the text editing section 636 may allow the user to view and edit the grow recipe.

Figure 7:
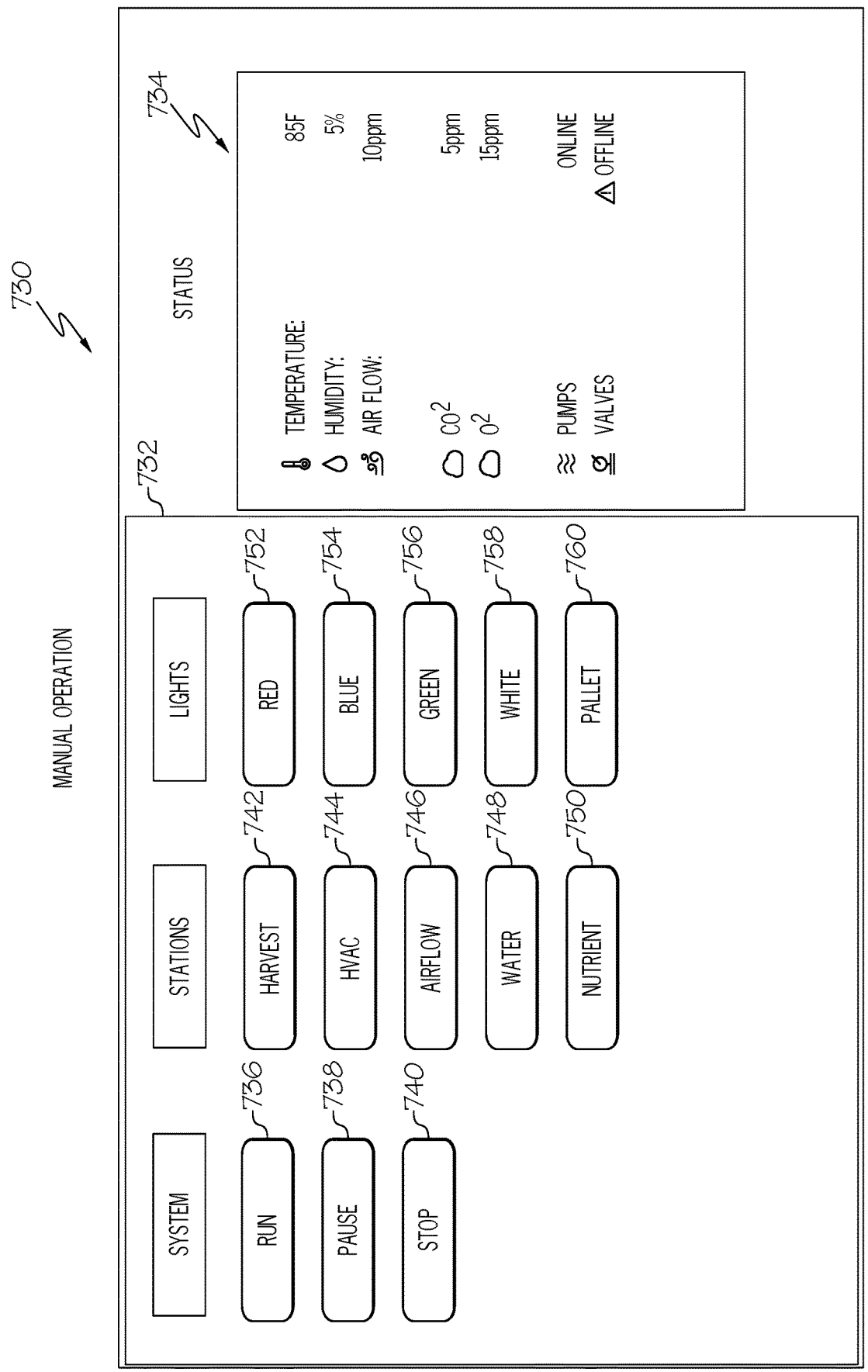
FIG. 7 depicts a user interface for manual operation of a grow pod, according to embodiments described herein.

FIG. 7 depicts a user interface 730 for manual operation of a grow pod 100, according to embodiments described herein. In response to selection of the manual option 442 from FIG. 4, the user interface 730 may be provided. As illustrated, the user interface 730 includes an operation section 732 and a status section 734. The operation section 732 may include a plurality of options associated with manual operation of the system, stations, and lights. As an example, the operation section 732 includes a run option 736, a pause option 738, and a stop option 740. In response to selection of the run option 736, the grow recipe may be run. In response to selection of the pause option 738, the grow recipe may be paused. In response to selection of the stop option 740, the grow recipe may be stopped.

Also provided in the operation section 732 are options related to one or more of the stations on the grow pod 100. Specifically, a harvest option 742, an HVAC option 744, an airflow option 746, a water option 748, and a nutrient option 750 are provided. In response to selection of the harvest option 742, one or more functions of the harvester component 238 (FIG. 2D) may be manually actuated. As an example, in response to selection of the harvest option 742, additional options may be associated with each function of the harvester component 238, such that the user may manually operate the harvester component 238.

In response to selection of the HVAC option 744, the HVAC (which may include a cooling device, a heating device, an airflow device, etc.) may be actuated and/or one or more other options may be provided for actuating components of the HVAC system, such as a cooling system, a heating system, and/or the like. In response to selection of the airflow option 746, the airflow system may be actuated and/or one or more options to actuate components of the airflow system may be provided. In response to selection of the water option 748, the watering device may be actuated and/or options for actuating one or more components of the watering device may be actuated. In response to selection of the nutrient option 750, the nutrient system may be actuated and/or options for actuating one or more components of the nutrient system may be actuated.

Also provided are light options, such as a red option 752, a blue option 754, a green option 756, a white option 758, and a pallet option 760 may be provided. These options may be selected for a user to turn one or more of the lighting devices on at the designated color. The pallet option 760 may provide further options for a user to select any of a plurality of different colors, intensities, etc.

Additionally, the status section 734 may provide information regarding one or more components of the grow pod 100. As will be understood, the status section 734 may change, depending on the particular option selected in the operation section 732. As an example, selection of one of the light options may cause the status section to change to display the status of each (or at least a portion) of the lights that are being controlled. Other changes may also be implemented.

Figure 8:
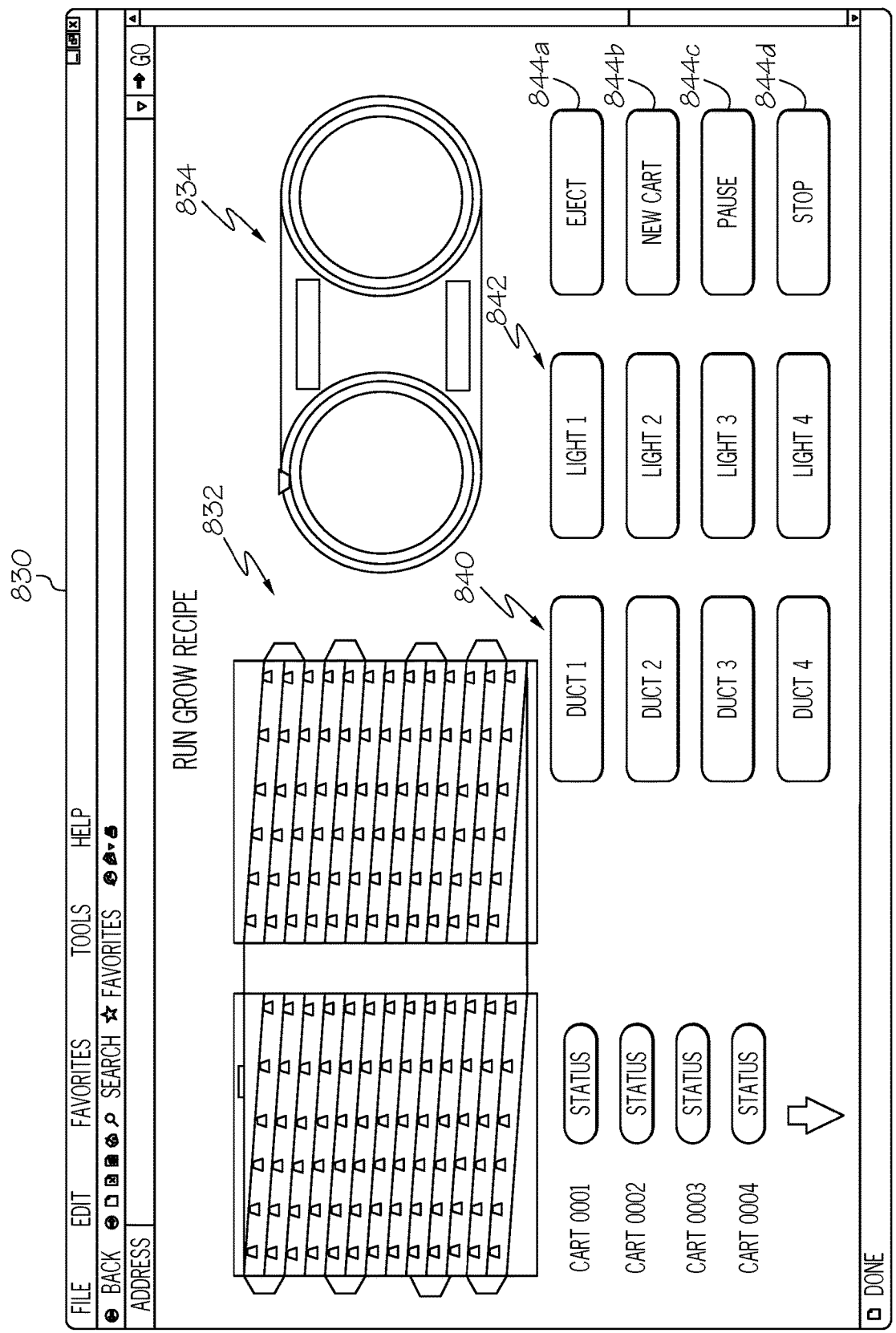
FIG. 8 depicts a user interface for running a grow pod, according to embodiments described herein.

FIG. 8 depicts a user interface 830 for running a grow pod, according to embodiments described herein. In response to selection of the run option 446 (FIG. 4) or run option 736 (FIG. 7), the user interface 830 may be provided. As illustrated, the user interface 830 may include a side view section 832 and a top view section 834, similar to FIG. 6. However, FIG. 8 also includes status options 836, duct options 840, light options 842, and actuation options 844 (e.g., an eject option 844a, a new cart option 844b, a pause option 844c and a stop option 844d). In response to selection of one or more of the status options 836, a status of the respective cart may be provided. The status information may include information regarding the operational status, location, current operation, and/or other data related to the respective cart.

As an example, by selecting the status option 836, cart 0001 the side view section 832 and the top view section 834 may highlight the location of the cart 0001. Additionally, the status information may be provided as a popup window or at other location in the user interface 830. If the user wishes to eject the cart 0001, the user may select the eject option 844a, which may direct that the cart 0001 is removed from services at the next available opportunity. In response to selection of new cart option 844b, a new cart may be introduced to the grow pod and managed accordingly.

In response to selection of one of the duct options 840, the side view section 832 and the top view section 834 may highlight the selected duct and additional options regarding status and control may be provided. In response to selection of one of the light options 842, the side view section 832 and the top view section 834 may highlight the selected lighting device and provide status information and additional options for control. Options for other components of the grow pod 100 may also be provided.

Figure 9:
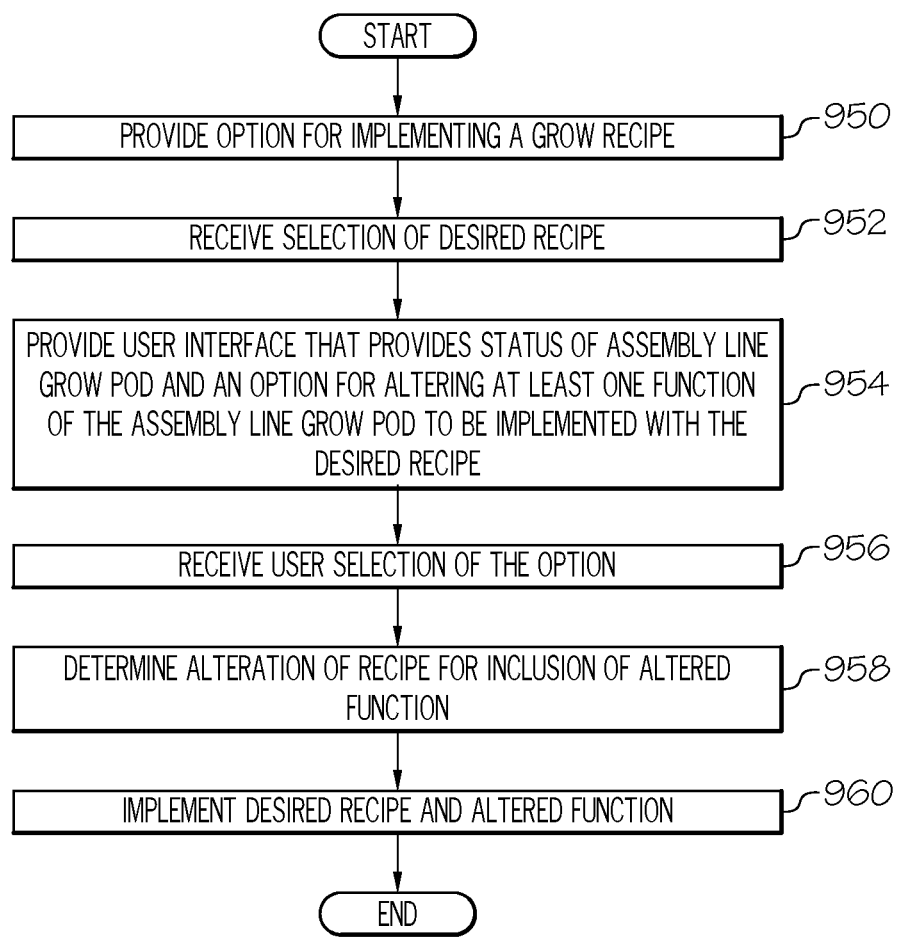
FIG. 9 depicts a flowchart for operating a grow pod, according to embodiments described herein.

FIG. 9 depicts a flowchart for operating a grow pod 100, according to embodiments described herein. As illustrated in block 950, an option for implementing a grow recipe for a grow pod 100 may be provided. In block 952, a selection of the desired recipe may be received. In block 954, a user interface may be provided that provides a status of the grow pod 100 and an option for altering at least one function of the grow pod 100 to be implemented with the desired recipe. In block 959, a user selection of the option may be received. In block 958, alteration of the recipe for inclusion of the altered function may be determined. In block 990, the desired recipe and altered function may be implemented.

Figure 10:
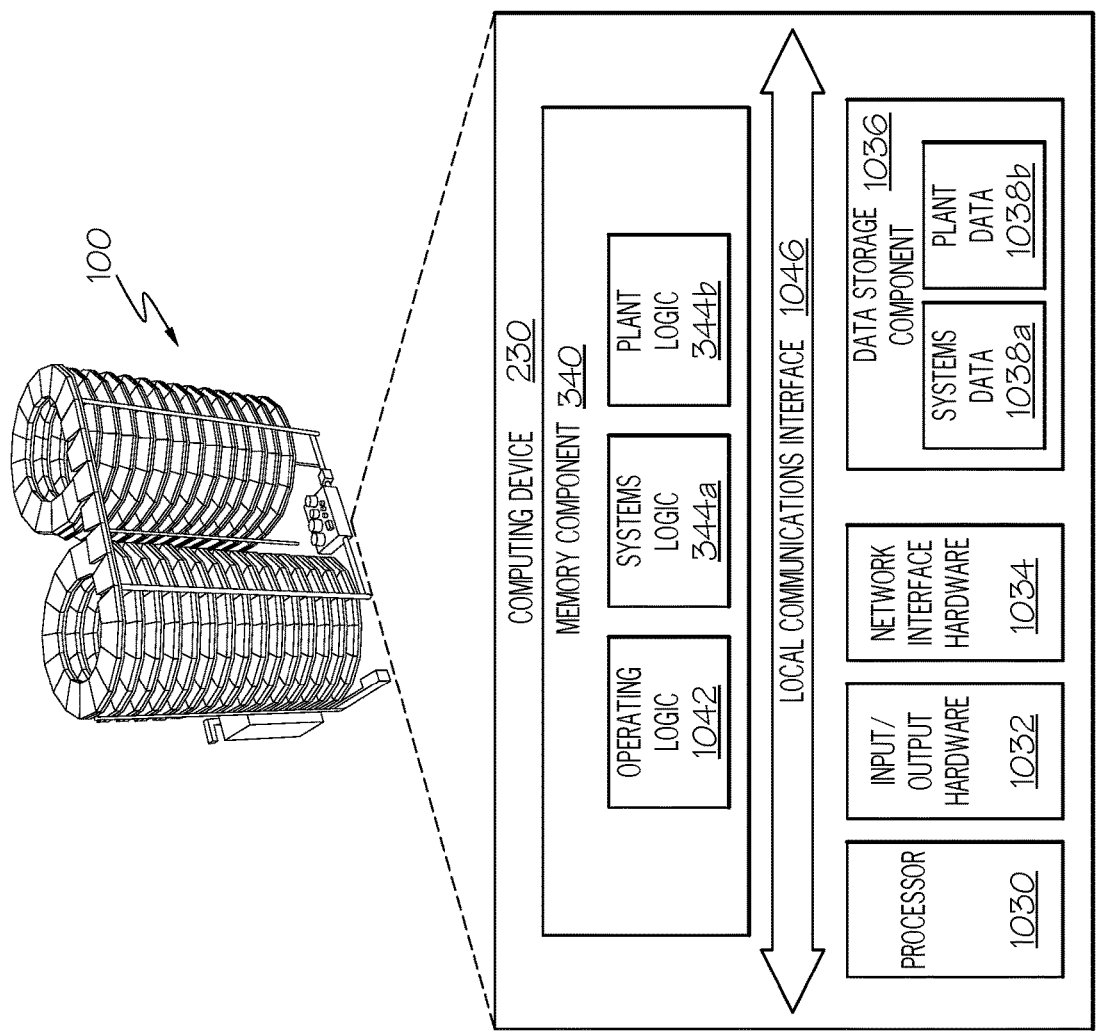
FIG. 10 depicts a computing device for an assembly line grow pod, according to embodiments described herein.

FIG. 10 depicts a pod computing device 230 for a grow pod 100, according to embodiments described herein. As illustrated, the pod computing device 230 includes a processor 1030, input/output hardware 1032, the network interface hardware 1034, a data storage component 1036 (which stores systems data 1038a, plant data 1038b, and/or other data), and the memory component 340. The memory component 340 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the pod computing device 230 and/or external to the pod computing device 230.

The memory component 340 may store operating logic 1042, the systems logic 344a, and the plant logic 344b. The systems logic 344a and the plant logic 344b may each include a plurality of different pieces of logic, each of which may be embodied as a computer program, firmware, and/or hardware, as an example. A local interface 1046 is also included in FIG. 10 and may be implemented as a bus or other communication interface to facilitate communication among the components of the pod computing device 230.

The processor 1030 may include any processing component operable to receive and execute instructions (such as from a data storage component 1036 and/or the memory component 340). The input/output hardware 1032 may include and/or be configured to interface with microphones, speakers, a display, and/or other hardware.

The network interface hardware 1034 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the pod computing device 230 and other computing devices, such as the user computing device 352 and/or remote computing device 354.

The operating logic 1042 may include an operating system and/or other software for managing components of the pod computing device 230. As also discussed above, systems logic 344a and the plant logic 344b may reside in the memory component 340 and may be configured to perform the functionality, as described herein.

It should be understood that while the components in FIG. 10 are illustrated as residing within the pod computing device 230, this is merely an example. In some embodiments, one or more of the components may reside external to the pod computing device 230. It should also be understood that, while the pod computing device 230 is illustrated as a single device, this is also merely an example. In some embodiments, the systems logic 344a and the plant logic 344b may reside on different computing devices. As an example, one or more of the functionalities and/or components described herein may be provided by the user computing device 352 and/or remote computing device 354.

Additionally, while the pod computing device 230 is illustrated with the systems logic 344a and the plant logic 344b as separate logical components, this is also an example. In some embodiments, a single piece of logic (and/or or several linked modules) may cause the pod computing device 230 to provide the described functionality.

As illustrated above, various embodiments systems and methods for operating an assembly line grow pod are disclosed. These embodiments provide for vertical and custom farming at a plant level of specificity.

Accordingly, embodiments may include systems and/or methods that include an assembly line grow pod that includes a computing device and a user input/output device, wherein the computing device includes logic that, when executed by the computing device causes the system to perform at least the following: provide an option for implementing a grow recipe; receive selection of a desired recipe; provide a user interface that provides a status of the assembly line grow pod and an option for altering at least one function of the assembly line grow pod to be implemented with the desired recipe; receive a user selection of the option; determine an alteration of the desired recipe for inclusion of the altered function; and implement the desired recipe with the altered function. As such, these embodiments may be configured to provide enhanced functionality to a new assembly line grow pod, such as determine an implement changes to a grow recipe. As such, embodiments are significant improvements over what is conventional in the farming industry.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for operating an assembly line grow pod. It should also be understood that these embodiments are merely exemplary and are not intended to limit the scope of this disclosure.

What is claimed is:

1. A system for operating a grow pod comprising:
   a cart that moves on a track of the grow pod, wherein the cart receives a seed for growing into a plant;
   a human-machine interface (HMI) that is coupled to the grow pod; and
   a pod computing device coupled to the HMI, wherein the pod computing device stores logic that, when executed by the pod computing device, causes the system to perform at least the following:
      receive a grow recipe for the seed in the cart, wherein the grow recipe includes actuation of at least one environmental affecter;
      provide a user option to alter functionality of the grow recipe;
      receive a user selection of the user option; and
      in response to receiving the user selection, alter functionality of the grow recipe.

2. The system of claim 1 further comprising a remote computing device, the remote computing device storing at least one user interface for providing via the HMI.

3. The system of claim 1 wherein the user option includes an option for a user to manually alter a recipe program of the grow recipe.

4. The system of claim 1 wherein the logic further causes the system to determine an alteration to the grow recipe and provide, via the HMI, the alteration and a user option to accept the alteration.

5. The system of claim 1, wherein the logic further causes the system to perform at least the following:
   determine an operational inefficiency of the cart;
   determine an operational alteration to the grow recipe to improve operational efficiency of the system;
   provide the operational alteration to the grow recipe to improve the operational efficiency of the system via the HMI; and
   provide a user option to accept the operational alteration to the grow recipe to improve the operational efficiency of the system via the HMI.

6. The system of claim 5, wherein the operational alteration includes at least one of the following: removing the cart, repairing the cart, or altering operation of the cart.

7. The system of claim 1, further comprising an assembly line grow pod that includes the track on which the cart travels.

8. The system of claim 1, wherein the logic further causes the system to perform at least the following:
   determine an improvement in growth of the plant on the grow pod;

determine a growth alteration to the grow recipe to further improve growth of the plant; and provide an option to accept the growth alteration to the grow recipe to a user via the HMI.

9. A grow pod comprising:

a track that passes a plurality of environment affecters for growing a plant;

a cart that moves on the track, wherein the cart receives the plant and travels the track for exposing the plant to output of the plurality of environment affecters;

a human-machine interface (HMI) that is coupled to the grow pod; and a pod computing device coupled to the HMI, wherein the pod computing device stores logic that, when executed by the pod computing device, causes the grow pod to perform at least the following:

receive a grow recipe for the plant in the cart, wherein the grow recipe includes actuation of the plurality of environment affecters;

determine if the grow recipe is formatted for the grow pod;

in response to a determination that the grow recipe is not formatted for the grow pod, determine a difference in a generic grow pod for which the grow recipe is formatted and the grow pod, and create an alteration to the grow recipe to operate on the grow pod;

provide a user interface via the HMI with a user option to accept the alteration;

receive, via the user interface, a user selection of the user option; and in response to receiving the user selection, alter functionality of the grow recipe.

10. The grow pod of claim 9, wherein the user option includes an option for a user to manually alter a recipe program of the grow recipe.

11. The grow pod of claim 9, wherein the logic further causes the grow pod to provide, via the user interface, the alteration and a user option to accept the alteration.

12. The grow pod of claim 9, wherein the logic further causes the grow pod to perform at least the following:

determine an operational inefficiency of the grow pod;

determine an operational alteration to the grow recipe to improve operational efficiency of the grow pod; and provide the operational alteration to the grow recipe to improve the operational efficiency of the grow pod via the user interface; and provide a user option to accept the operational alteration to the grow recipe to improve the operational efficiency of the grow pod via the user interface.

13. The grow pod of claim 12, wherein the operational alteration includes at least one of the following: removing the cart, repairing the cart, altering operation of the cart, or altering operation of at least one of the plurality of environment affecters.

14. The grow pod of claim 9, wherein the logic further causes the grow pod to perform at least the following:

determine an improvement in growth of the plant on the grow pod;

determine a growth alteration to the grow recipe to further improve growth of the plant; and provide an option to accept the growth alteration to the grow recipe to a user via the user interface.

15. The grow pod of claim 9, wherein the plurality of environment affecters includes at least one of the following: a lighting device, a cooling device, a heating device, an airflow device, a watering device, or a nutrient device.

\* \* \* \* \*